Feb. 19, 1952               C. C. RUSSELL               2,586,265
TROUBLE LIGHT FOR ILLUMINATING WORK
AREAS AND PROJECTING WARNING BEAMS
Filed Sept. 25, 1947                                        2 SHEETS—SHEET 1
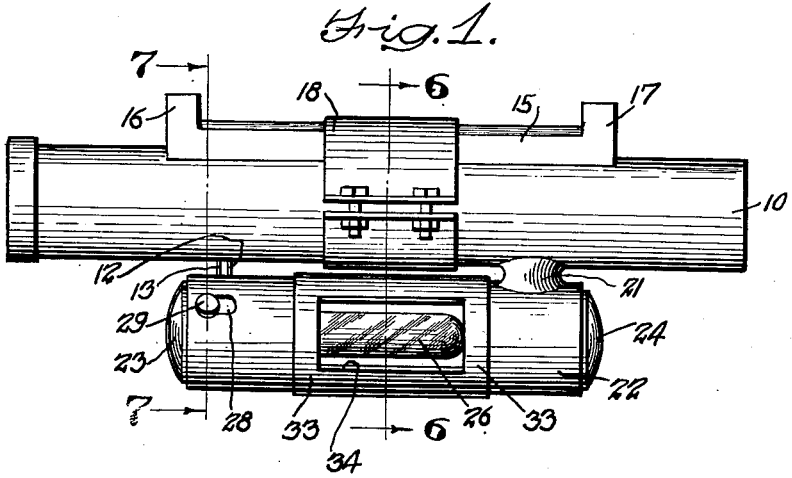
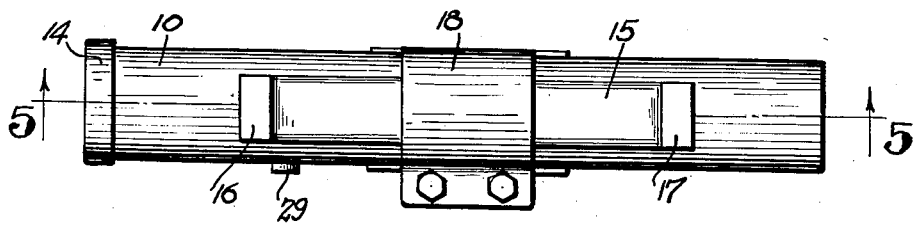
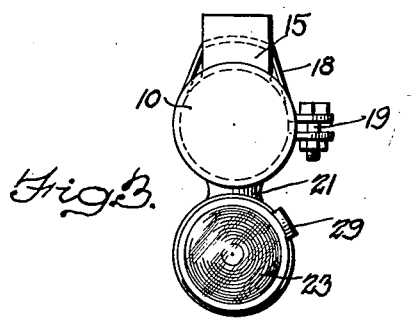
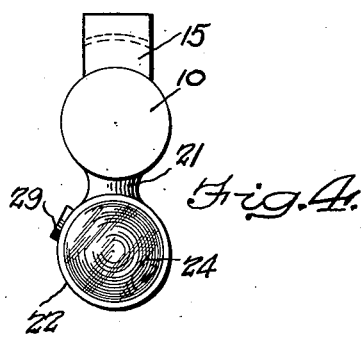
INVENTOR.
Clyde C. Russell.
BY Victor J. Evans & Co.
ATTORNEYS Feb. 19, 1952 — C. C. RUSSELL — 2,586,265
TROUBLE LIGHT FOR ILLUMINATING WORK AREAS AND PROJECTING WARNING BEAMS
Filed Sept. 25, 1947
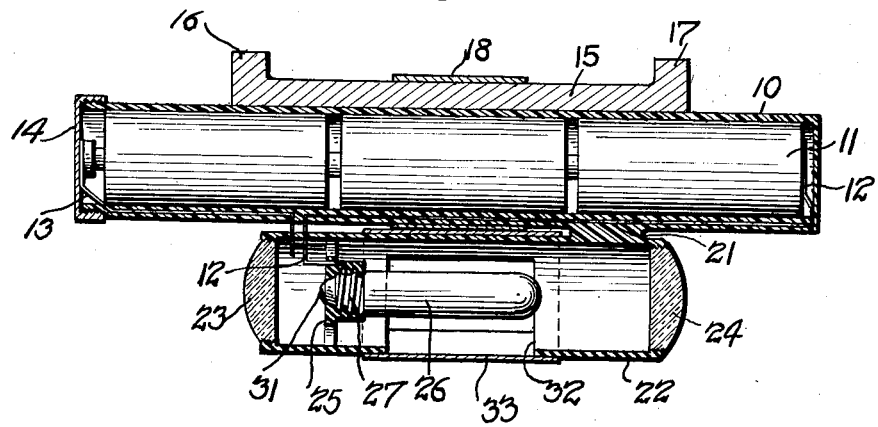
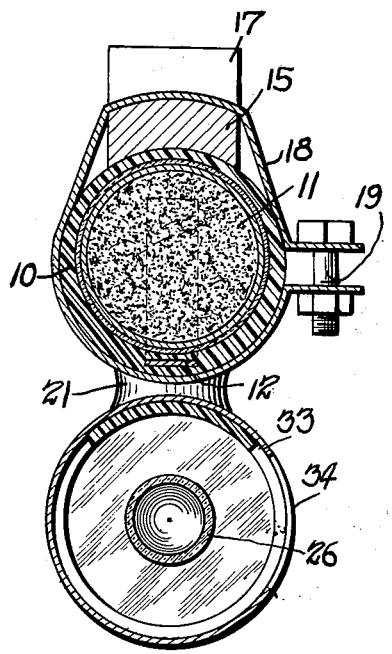
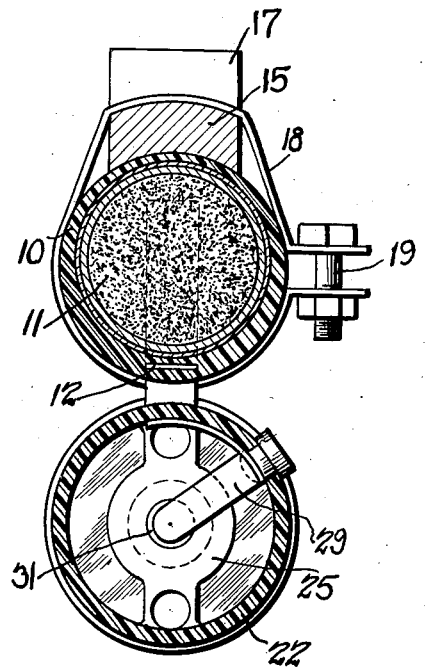
INVENTOR.
Clyde C. Russell.
BY Victor J. Evans & Co.
ATTORNEYS Patented Feb. 19, 1952

2,586,265

UNITED STATES PATENT OFFICE 2,586,265

TROUBLE LIGHT FOR ILLUMINATING WORK AREAS AND PROJECTING WARNING BEAMS

Clyde C. Russell, Trona, Calif.

Application September 25, 1947, Serial No. 776,027

1 Claim. (Cl. 240—52.5)

This invention relates to magnetic trouble light.

It is an object of the present invention to provide a trouble light for use around automobiles and machinery which can be secured to any metal part so as to properly direct the rays of light upon the work or may be rested easily upon a non-metallic and non-magnetic part and wherein the light can be emitted in an eye fashion upon a lens or may be directed through the side of the retainer for the lamp bulb and controlled by a shutter.

Other objects of the present invention are to provide a magnetic trouble light which is compact, simple in construction, inexpensive to manufacture, arranged with the lamp extending parallel to the battery container and exteriorly thereof, convenient to use and efficient in operation.

For other objects and for a better understanding of the invention, reference may be had to the following detailed description taken in connection with the accompanying drawing, in which Fig. 1 is a side elevational view of the trouble light embodying the features of the present invention, Fig. 2 is a top plan view of my trouble light, Figs. 3 and 4 are respectively opposite end views of my trouble light, Fig. 5 is a longitudinal cross-sectional view taken on line 5—5 of Fig. 2, Figs. 6 and 7 are respectively transverse sectional views taken respectively on lines 6—6 and 7—7 of Fig. 1.

Referring now to the figures, 10 represents a battery casing of insulating material adapted to contain a plurality of batteries 11 arranged end to end. A terminal 12 extends from the interior of the casing and through the casing material and outwardly thereof. Terminal 13 extends from the opposite end of the battery and through the casing material and outwardly thereof. A metal cap 14 is secured over the open end of the casing 10 and may be removed to replace the batteries. Extending from one side of the casing 10 is a permanent magnet 15 having outwardly bent portions or legs 16 and 17 for engagement with a metallic surface, engine or machine part. The magnet 15 is secured to the casing 10 by a clamp 18 and bolt 19. The bolt 19 extends through the ends of the clamp strap to bring the ends together to tighten the clamp.

In order to provide sufficient space for the terminal strips 12 and 13 to be embedded in the casing material, the under portion containing these strips is made thicker than the top portions, Figs. 6 and 7.

Depending from the under portion of the casing 10 is an integral connection 21 from which hangs an insulating casing 22 having its longitudinal axis extending parallel to the axis of the battery casing 10 and preferably at the opposite side of the casing 10 from which the magnet 15 is located.

The casing 22 has lenses 23 and 24 connected respectively to oppoiste ends through which light is transmitted in bull's-eye fashion.

Within the casing 22 is a transverse support 25 adapted to threadingly receive an elongated lamp bulb 26. The terminal strip 12 extends to the transverse support for contact with base 27 of the lamp bulb 26. Slidable in a slot 28 in the casing 22 is a switch button 29 connected with the terminal strip 13 and adapted to be slid into and out of engagement with contact 31 on the end of the lamp bulb 26.

In the side of the casing 22 is a slot 32 through which light from the lamp bulb 26 can be extended. In order to control or shade this light there is provided an adjustable sleeve 33 which can be rotated on the casing 22. This sleeve 33 has an opening 34 through which the light may pass.

While various changes may be made in the detail construction it shall be understood that such changes shall be within the spirit and scope of the present invention as defined by the appended claim.

I claim:

In a trouble light, the combination which comprises an elongated tubular battery casing having a closed end, a cap threaded on the opposite end of the battery casing having a centrally disposed battery terminal contact therein, a tubular lamp casing positioned parallel to said battery casing and integrally connected at one end to said battery casing, the intermediate part of said lamp casing having an opening therein, lenses mounted in the ends of the said lamp casing, a sleeve having a window therein rotatably mounted on said lamp casing with the window of the sleeve positioned to register with the said opening of said casing, a lamp support transversely positioned in said lamp casing intermediate of the ends thereof whereby a lamp carried thereby provides light rays through the lenses at the ends of the lamp casing and also through the window of the sleeve on the casing, strips connecting the contacts of the battery casing to lamp terminals of the said lamp support, a switch positioned to be actuated from the exterior of the lamp casing and positioned to open or close a circuit to the lamp through the lamp terminals, a member positioned on said battery casing adapted to attach the light to a support, and a clamp removably mounting the member on the said battery casing.

CLYDE C. RUSSELL.

REFERENCES CITED

The following references are of record in the file of this patent:

UNITED STATES PATENTS

| Number | Name | Date |
|---|---|---|
| 1,121,293 | Sachs | Dec. 15, 1914 |
| 1,641,880 | Cohen | Sept. 6, 1927 |
| 1,875,956 | Thiel | Sept. 6, 1932 |
| 1,932,143 | Piercy | Oct. 24, 1933 |
| 1,974,294 | Walsh | Sept. 18, 1934 |
| 2,001,363 | Joers | May 14, 1935 |
| 2,039,205 | Anderl | Apr. 28, 1936 |
| 2,215,829 | Evans | Sept. 24, 1940 |
| 2,241,741 | Schmitt | May 13, 1941 |
| 2,374,161 | Belden | Apr. 24, 1945 |
| 2,413,628 | Hinds | Dec. 31, 1946 |

FOREIGN PATENTS

| Number | Country | Date |
|---|---|---|
| 553,030 | France | Feb. 2, 1923 |